G. GOETZ.
AUTOMATIC WEIGHING AND RECORDING CAR SCALE.
APPLICATION FILED MAY 22, 1908.

946,601.

Patented Jan. 18, 1910.
9 SHEETS—SHEET 1.

Witnesses:
Wm. Geiger
H. W. Munday

Inventor:
George Goetz
By Munday, Evarts, Adcock & Clarke,
Attorneys

G. GOETZ.
AUTOMATIC WEIGHING AND RECORDING CAR SCALE.
APPLICATION FILED MAY 22, 1908.

946,601.

Patented Jan. 18, 1910.
9 SHEETS—SHEET 2.

Fig. 2

Witnesses

Inventor:
George Goetz

By Munday, Evarts, Adcock & Clarke,
Attorneys

G. GOETZ.
AUTOMATIC WEIGHING AND RECORDING CAR SCALE.
APPLICATION FILED MAY 22, 1908.

946,601.

Patented Jan. 18, 1910.
9 SHEETS—SHEET 3.

Witnesses:
Wm. Geiger

Inventor:
George Goetz
By Munday, Evarts, Adcock & Clarke.
Attorneys

G. GOETZ.
AUTOMATIC WEIGHING AND RECORDING CAR SCALE.
APPLICATION FILED MAY 22, 1908.

946,601.

Patented Jan. 18, 1910.

Witnesses:
Wm. Geiger
H. W. Munday

Inventor:
George Goetz
By Munday, Evarts, Adcock & Clark,
Attorneys

G. GOETZ.
AUTOMATIC WEIGHING AND RECORDING CAR SCALE.
APPLICATION FILED MAY 22, 1908.

946,601.

Patented Jan. 18, 1910.
9 SHEETS—SHEET 7.

Witnesses:
Wm. Geiger
H. M. Munday

Inventor:
George Goetz
By Munday, Evarts, Adcock & Clarke
Attorneys

G. GOETZ.
AUTOMATIC WEIGHING AND RECORDING CAR SCALE.
APPLICATION FILED MAY 22, 1908.

946,601.

Patented Jan. 18, 1910.

Witnesses
Wm. Geiger
H. M. Munday

Inventor:
George Goetz
By Munday, Evarts, Adcock & Clarke
Attorneys

G. GOETZ.
AUTOMATIC WEIGHING AND RECORDING CAR SCALE.
APPLICATION FILED MAY 22, 1908.

946,601.

Patented Jan. 18, 1910.

Witnesses:

Inventor:
George Goetz
By Munday, Evarts, Adcock & Clark
Attorneys

UNITED STATES PATENT OFFICE.

GEORGE GOETZ, OF CHICAGO, ILLINOIS, ASSIGNOR TO STREETER-AMET WEIGHING AND RECORDING COMPANY, OF CHICAGO, ILLINOIS, A CORPORATION OF ILLINOIS.

AUTOMATIC WEIGHING AND RECORDING CAR-SCALE.

946,601.   Specification of Letters Patent.   Patented Jan. 18, 1910.

Application filed May 22, 1908. Serial No. 434,426.

*To all whom it may concern:*

Be it known that I, GEORGE GOETZ, a citizen of the United States, residing in Chicago, in the county of Cook and State of Illinois, have invented a new and useful Improvement in Automatic Weighing and Recording Car-Scales, of which the following is a specification.

My invention relates to automatic weight printing or recording car scales.

My invention consists in the novel construction of parts and devices and in the novel combinations of parts and devices herein shown and more particularly specified in the claims.

In the accompanying drawing, forming a part of this specification, Figure is a side elevation of an automatic weight recording or printing car scale embodying my invention.

Figure 1:
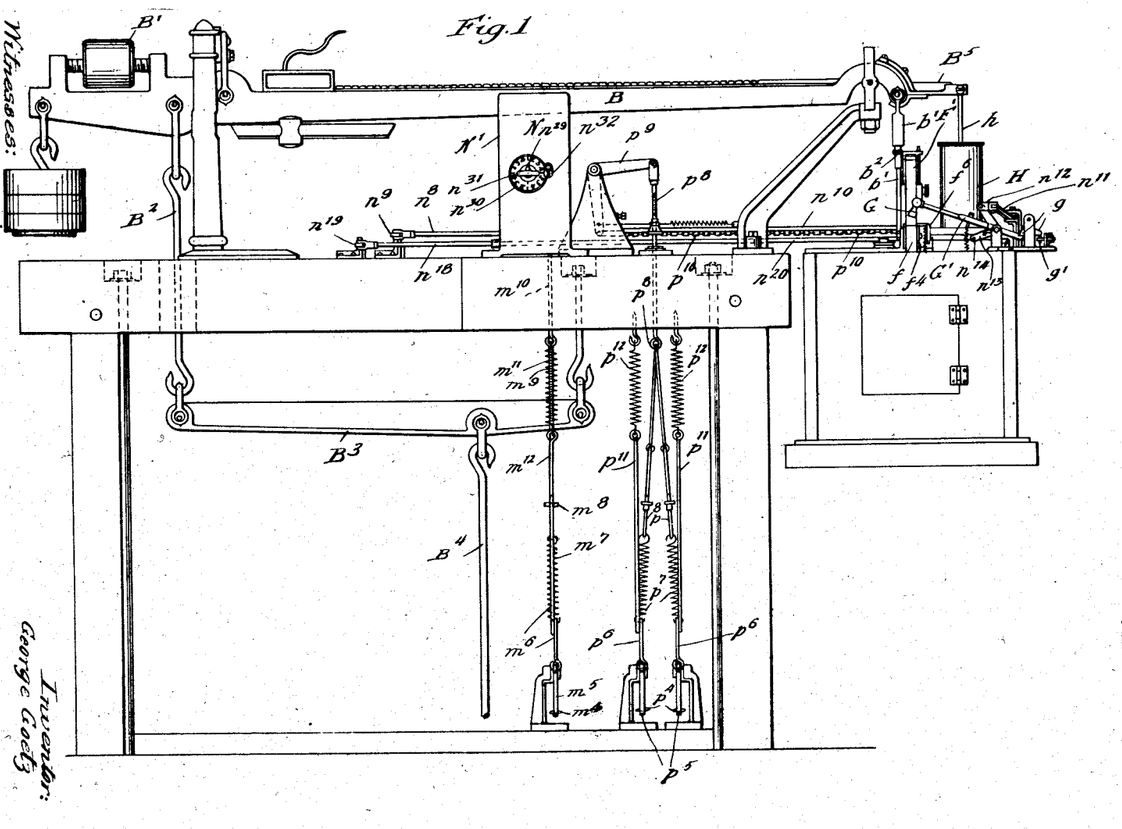
Figure 2:
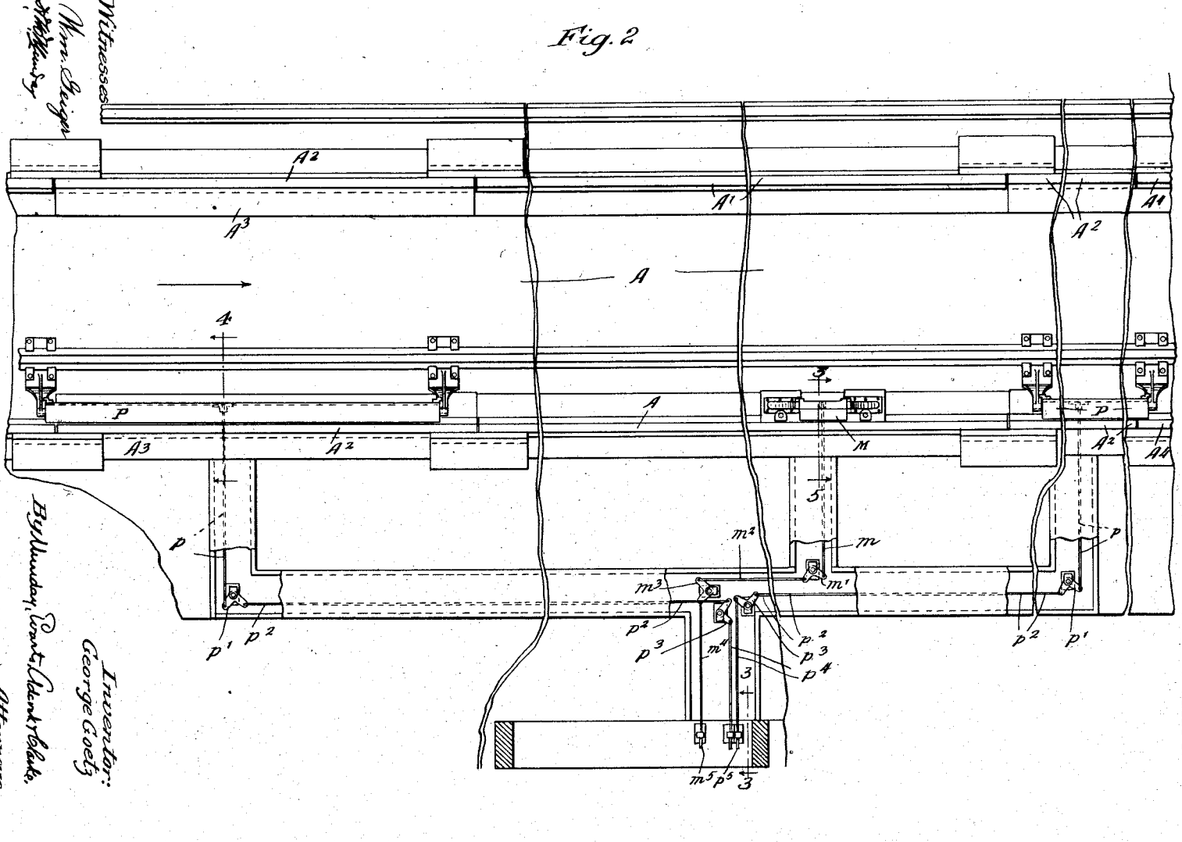
Fig. 2 is a plan view of the car scale platform, partially broken away and showing certain parts in horizontal section.
Figure 3:
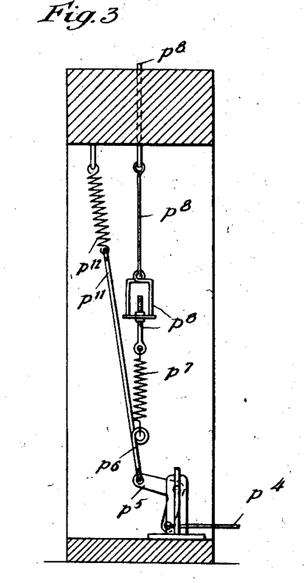
Figs. 3, 4 and 5 are detail vertical sections on line 3—3, 4—4 and 5—5 respectively of Fig. 2.
Figure 4:
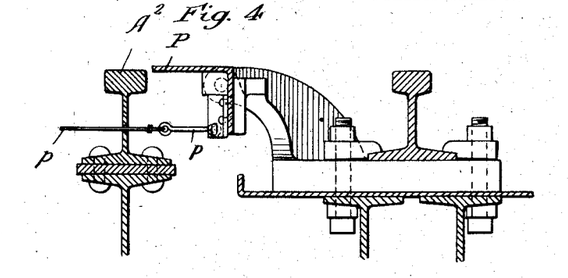
Figure 5:
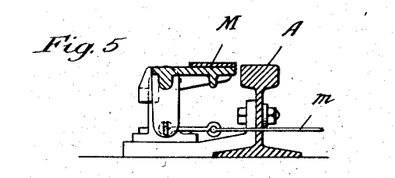
Figure 6:
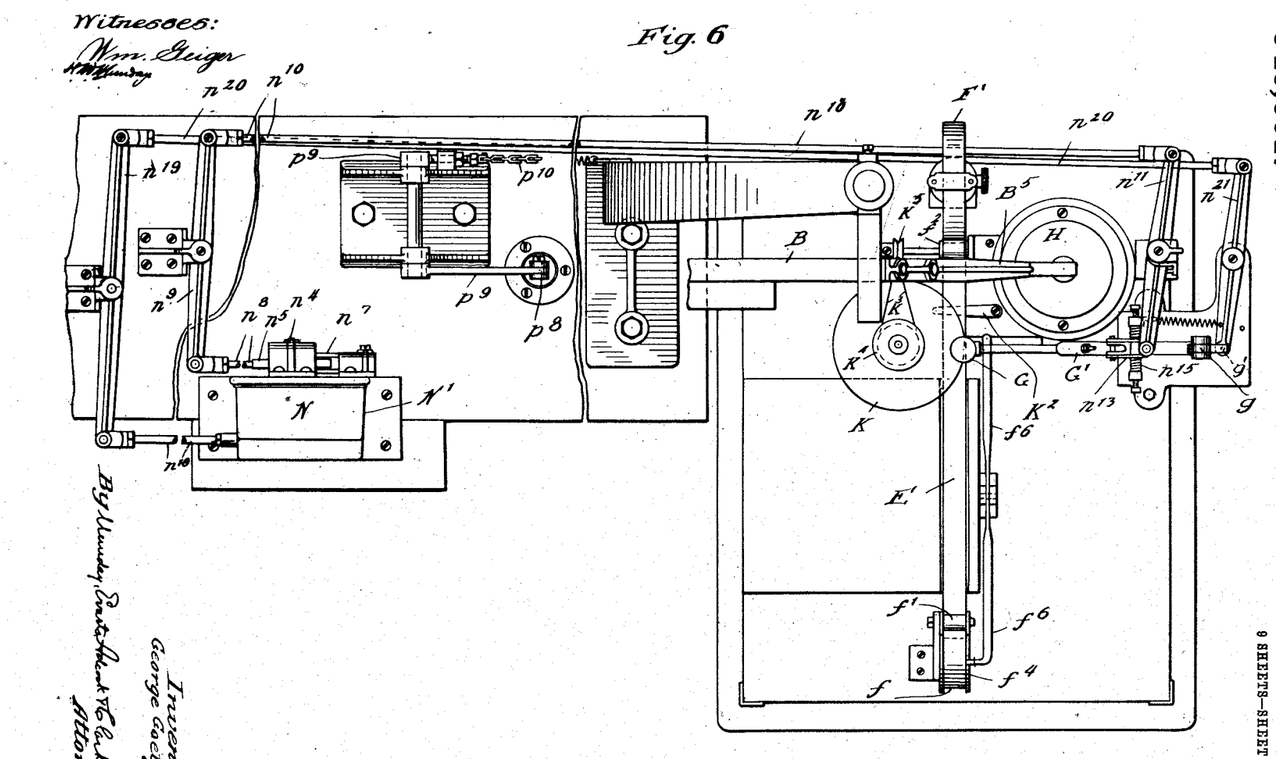
Fig. 6 is a detail partial plan view of certain parts removed.
Figure 7:
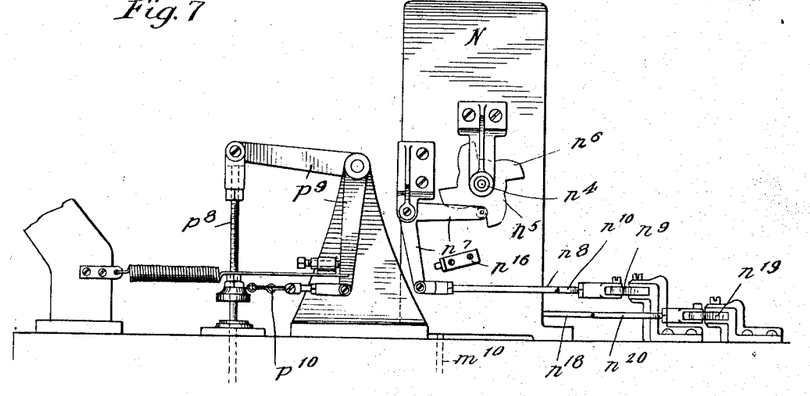
Fig. 7 is a partial rear elevation.
Figure 8:
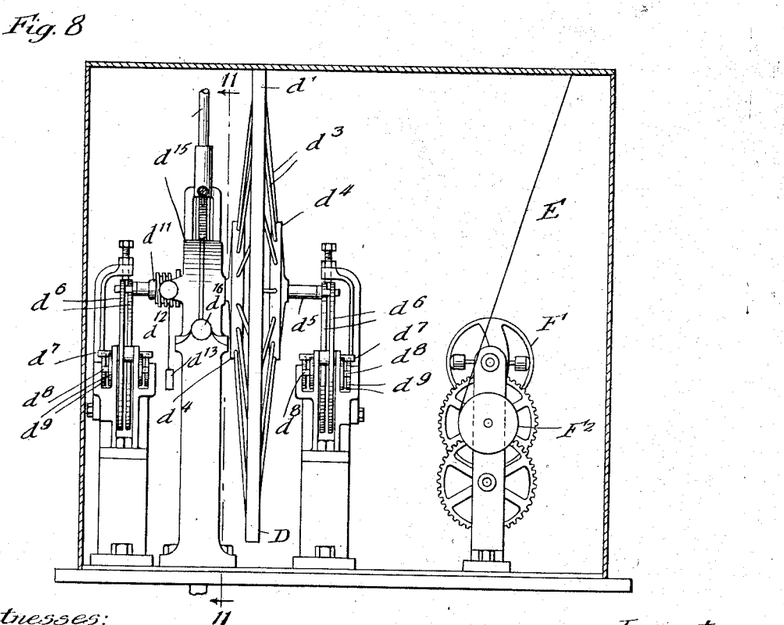
Fig. 8 is a front elevation of the type wheel, showing its box or case in vertical section.
Figures 9, 10:
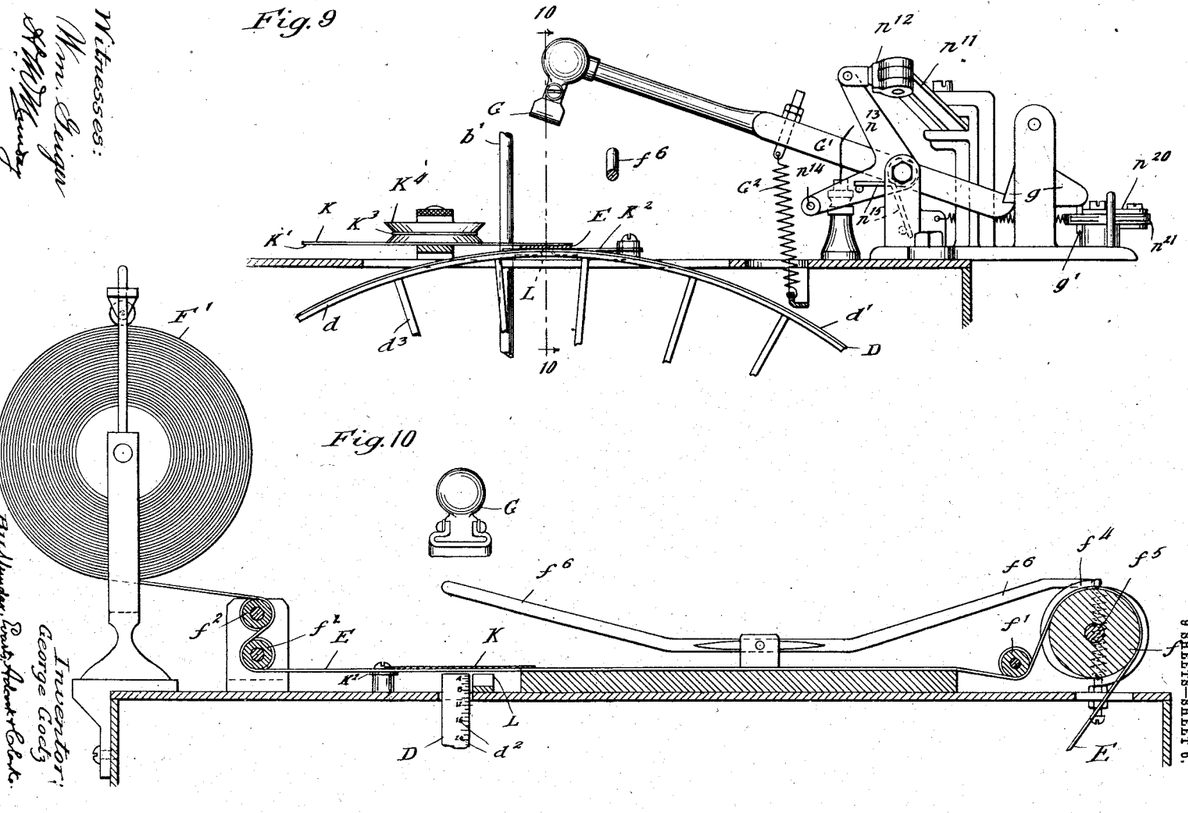
Fig. 9 is a partial side elevation showing the printing hammer and a portion of the type wheel and showing certain parts in vertical section.
Fig. 10 is a section on line 10—10 of Fig. 9.
Figure 11:
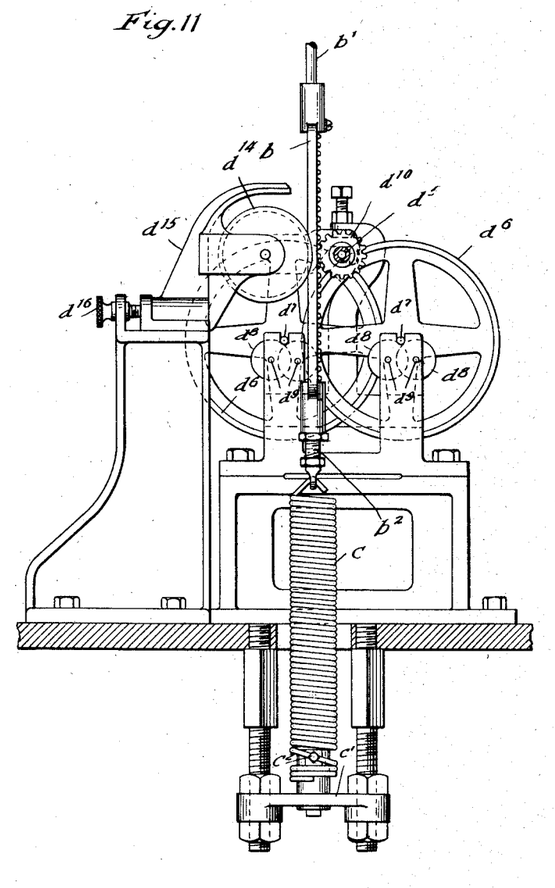
Fig. 11 is a detail section on line 11—11 of Fig. 8.
Figure 12:
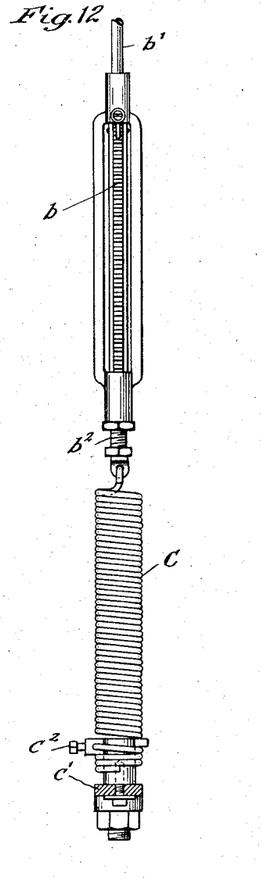
Fig. 12 is a detail elevation of the counterbalance spring and rack for operating the type wheel.
Figure 13:
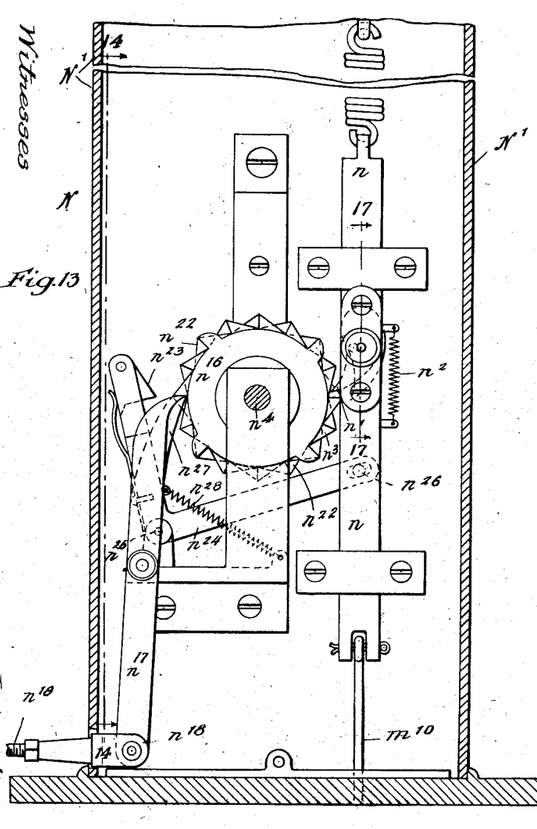
Fig. 13 is a detail elevation of the track lever and printing hammer setting mechanism, showing certain parts in section on line 13—13 of Fig. 14.
Figure 14:
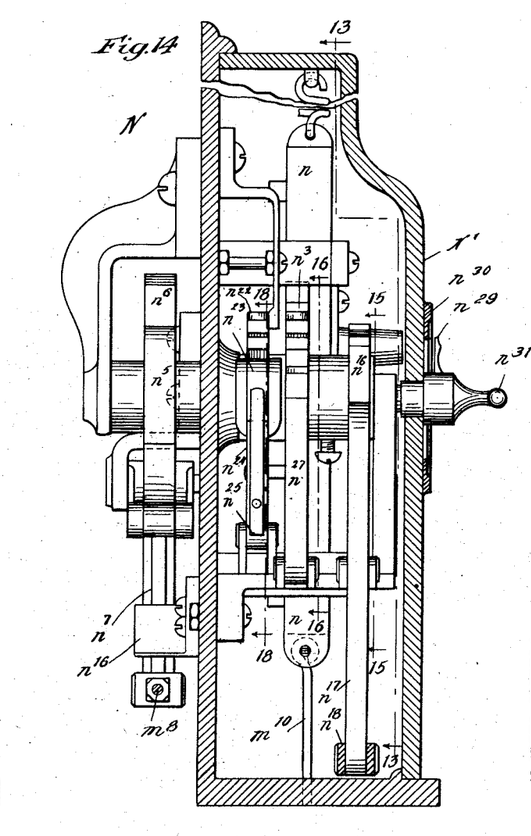
Fig. 14 is a side elevation of the same, partly in section, on line 14—14 of Fig. 13.
Figures 15, 19:
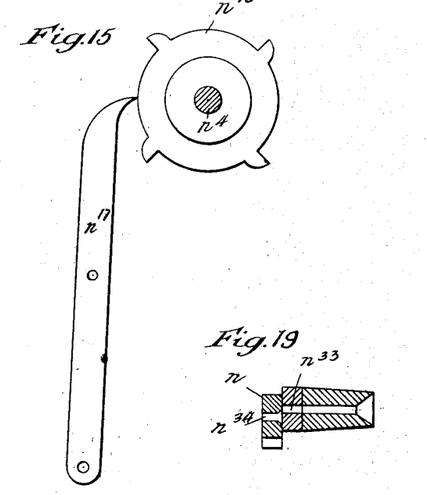
Fig. 15 is a detail section on line 15—15 of Fig. 14.
Figs. 19 and 20 are detail sections on line 19—19 of Fig. 17, showing the parts in different positions.
Figure 16:
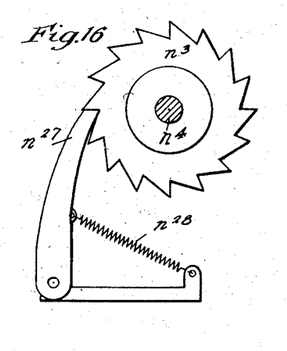
Fig. 16 is a detail section on line 16—16 of Fig. 14.
Figures 17, 18, 20:
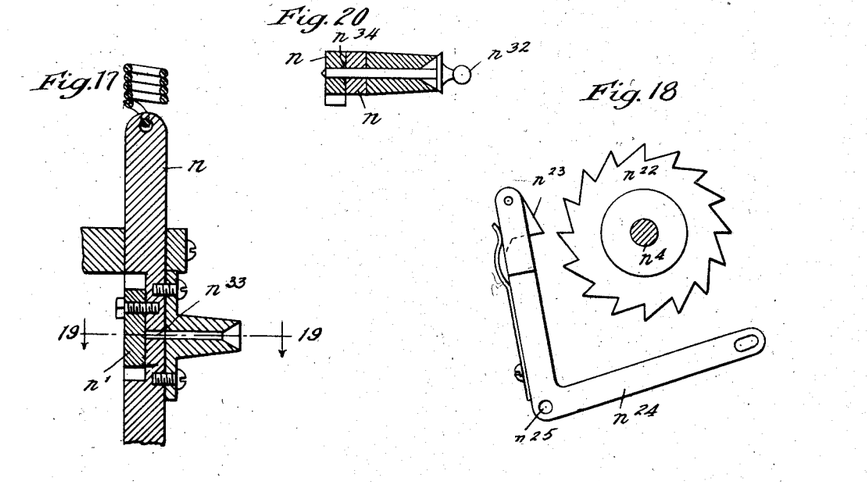
Fig. 17 is a detail section on line 17—17 of Fig. 13.
Fig. 18 is a detail section on line 18—18 of Fig. 14.
Figure 21:
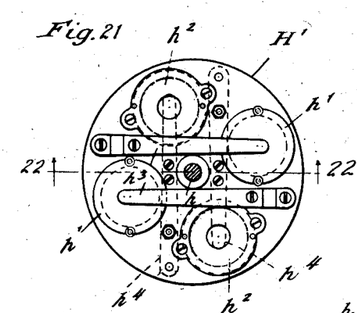
Fig. 21 is a detail plan view of the dash pot piston and valve mechanism.
Figure 22:
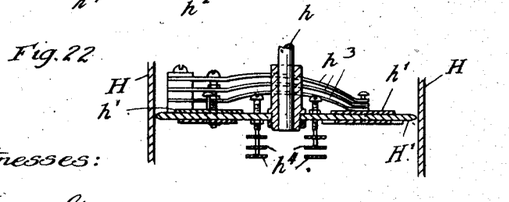
Fig. 22 is a vertical section on line 22—22 of Fig. 21.
Figure 23:
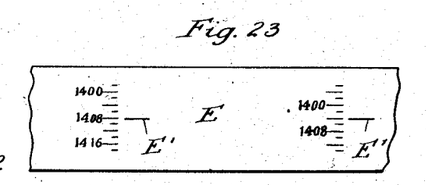
Fig. 23 is a detail plan view showing a portion of the paper ribbon on which the weight is printed or indicated.

In the drawing A represents the scale platform, $A^1$ the track rails thereon, $A^2$ the flexible track rails partially on the scale platform and partially on the surrounding frame $A^3$ thereof, and which connect with the tracks $A^4$, B the scale beam, C the counter balance spring, D the type wheel, E the paper strip or ribbon, F the feed device therefor, G the impression hammer, H the dash pot, K the inking or printing disk, L the stationary indicator type, M the track lever, N the track lever and printing hammer lever counter or setting device and P P the guard track levers.

The car scale platform A is provided with track rails $A^1$ thereon connecting through flexible rails $A^2$ with the track rails $A^3$ of the railway track leading thereto, so that cars one after another may be run continuously over the scale platform, each car weighed and its weight automatically recorded while it is in motion as it passes over the scale platform.

The scale beam B has the customary counterbalance weight $B^1$ for the purpose of balancing the scale. The scale beam B is connected with the scale levers beneath and upon which the scale platform rests, by suitable connecting levers and links or clevises $B^2$ $B^3$ $B^4$. The scale beam B is further provided with a removable extension $B^5$ which is connected with the piston stem $h$ of the dash pot H. The scale beam B is further connected at its outer end with the counterbalance spring C through a rack $b$ and connecting links $b^1$ furnished with adjusting devices $b^2$.

The counterbalance spring C is furnished with suitable tension adjusting clamps or devices $C^1$ $C^2$.

The type wheel D has a rim $d$, type band $d^1$ furnished with numeral printing type $d^2$ and spokes $d^3$ secured to a double rimmed hub $d^4$ fixed to a shaft $d^5$ which is journaled at its end on a pair of antifriction wheels $d^6$, the shafts $d^7$ of each of which is journaled on a pair of antifriction wheels $d^8$, the shafts $d^9$ of which are journaled on the frame of the machine. The type wheel shaft $d^5$ is provided with a gear $d^{10}$ which meshes with the rack $b$ that forms one of the connecting links between the scale beam B and counter-balance spring C. The shaft $d^5$ of the type wheel D is furnished with a grooved pulley $d^{11}$ to receive the cord $d^{12}$ of a light weight $d^{13}$ which balances the force required to turn the type wheel and the mechanism connected therewith. This weight serves to steady the type wheel, take up back lash and to insure a more certain and accurate weighing.

The rack $b$ is automatically guided in its up and down movement by a flanged roller or wheel $d^{14}$ journaled on a bracket $d^{15}$ adjustably secured to the frame by the adjusting screws $d^{16}$.

The paper strip or ribbon E upon which the weight of each car is printed or recorded, is automatically fed by the motor feed device F from the supply reel or spool $F^1$ to the take up spool $F^2$. The paper strip passing over or around the guide rollers $f$ $f^1$ $f^3$ and transversely over the upper portion of the type wheel D and the stationary pointer type L which prints an indicator mark $E^1$ on the paper strip E to indicate the true weight in connection with the numerals indicating hundreds of pounds impressed upon the paper strip by the type wheel D. The spring or other paper feed motor F keeps the paper strip E normally under tension so that the paper feeds forward the required length at each stroke of the printing hammer G when it releases the notched disk $f^4$ on the shaft $f^5$ of the guide roller $f$ by depressing the spring pawl lever $f^6$ so that said spring pawl lever is swung out of engagement with said notched disk $f^4$.

The printing hammer G is mounted on a lever $G^1$ having a spring $G^2$ which actuates the printing hammer to strike the required blow against the type wheel D and stationary pointer type L the instant the printing hammer lever is released by movement of the releasing trigger or pawl $g$ which holds the printing hammer in its raised position ready to print the weight of the car.

To steady the movement of the scale beam and prevent vibration of the type wheel D, and thus cause the scale beam to come quickly to a true balance for each car as it passes over the scale platform under continuous motion, the piston $H^1$ of the dash pot H is furnished with two upwardly opening valves $h^1$ $h^1$, and two downwardly opening valves $h^2$ $h^2$, each of the valves being of comparatively large diameter and held closed by light flexible flat springs $h^3$ $h^5$ of graduated strength or tension.

The inking or printing disk K is furnished on its under face preferably with carbon paper $K^1$ glued thereto, and it is rotated at intervals as required by the friction of the paper strip E against it as said paper strip feeds forward and the guide spring $K^2$ pressing the paper strip against the printing disk K so as to cause it to turn, and thus bring a new surface into position for each impression. A cord or belt $K^3$ passing around a pulley $K^4$ on the shaft of the disk K, and a pulley $K^5$ on the shaft of the paper strip guide roller $f^2$ also communicates motion to the printing disk.

The impression hammer lever $G^1$ is automatically raised into position ready for printing, and the trigger $g$ which holds it in its raised position ready for printing, is automatically released by operation of a bail-shaped track lever M located closely adjacent to and parallel with one of the track rails $A^1$ on the scale platform and in the path of the flange of the car wheels. Two additional track levers P P located one near each end of the scale platform adjacent to the flexible connecting rails $A^2$, are employed to automatically guard against or prevent operation of the printing hammer while any wheel of the car is partially resting upon either of the flexible connecting rails $A^2$ at either end of the scale platform. The stationary indicator type L which is mounted on the stationary frame of the machine adjacent to the type wheel D, so that the impression hammer G will cause both the numeral type on the type wheel and indicator type L to simultaneously make an impression upon the paper strip E, preferably simply prints a straight line or indicator mark, which in connection with the numerals printed by the type wheel and representing ordinarily the even hundred pounds, will thus record the true weight within limits of fifty pounds by the relation of the indicator mark to the numerals representing the even hundreds of pounds printed on the paper strip. Motion is communicated from the single main track lever M, which is located preferably near, but some little distance from, the exit end of the scale platform, to the setting or counter mechanism N by means of a connecting link $m$, bent lever $m^1$, link $m^2$, bent lever $m^3$, link $m^4$, bent lever $m^5$, link $m^6$ furnished with springs $m^7$, adjustable couplings $m^8$, links $m^9$ and links $m^{10}$. The bent lever $m^5$ is also furnished with a spring $m^{11}$ connected to an extension $m^{12}$ on the link $m^6$, which serves to hold the lever $m^5$ in its normal position. The link $m^{10}$ connects with the sliding bar $n$ of the setting or counter device N. This sliding bar $n$ has a pivoted pawl $n^1$ held in operative position by a spring $n^2$ to engage a ratchet wheel $n^3$ on the shaft $n^4$, so that said shaft is turned a distance of one ratchet tooth for each car wheel passing over the bent track lever M. The shaft $n^4$ of the counter device N is provided with a cam $n^5$ having one projection $n^6$ for each four teeth of the ratchet wheel $n^3$, so that the cam will be operated once for each four movements of the ratchet wheel, the apparatus illustrated in the drawing is specially designed for weighing ordinary freight cars having two wheeled trucks, or four wheels in all on each side of the car. The cams $n^5$ at the third movement of the ratchet $n^3$ operates to raise the impression hammer G through the connecting bent lever $n^7$, link $n^8$, lever $n^9$, link $n^{10}$, lever $n^{11}$, link $n^{12}$, and bent lever $n^{13}$, which has a pin or projection $n^{14}$ passing under the impression hammer lever $G^1$. When the impression hammer lever is thus raised in position by the third movement of the ratchet $n^3$ it is automatically held in this position by the releasing pawl $g$, and the fourth step or movement of the ratchet $n^3$ moves the cam $n^5$ out of contact with the bent lever $n^7$ and allows the bent levers $n^7$ and $n^{13}$, and their connections, to return to their normal position in obedience to the spring $n^{15}$, so that the impression hammer lever $G^1$ may be free to descend when released by the trigger $g$. Stops or buffers $n^{16}$ secured to the box or case $N^1$ limit the movement of the levers in one direction.

The impression hammer releasing trigger $g$ is automatically moved to release the impression hammer lever $G^1$ at the fourth movement or step of the ratchet $n^3$ by means of the cam wheel $n^{16}$ on the shaft $n^4$, operating lever $n^{17}$, connected to a link $n^{18}$, through levers $n^{19}$, link $n^{20}$, and lever $n^{21}$, which engages a pin $g^1$ on the releasing trigger $g$, and thus moves said trigger to release said impression hammer lever $G^1$.

To prevent over rotation of the rotation of the ratchet shaft $n^4$ said shaft is provided with a reverse ratchet $n^{22}$, which is engaged by a pawl $n^{23}$, pivoted to the bent lever $n^{24}$, which is pivoted at $n^{25}$ to the frame and connected at $n^{26}$ to the sliding bar $n$, so that when said slide $n$ operates the ratchet $n^3$ it will through said bent lever $n^{22}$ throw said pawl $n^{23}$ into engagement with said reverse ratchet end 22. To prevent any backward movement of the ratchet $n^3$ the pawl $n^{27}$ is provided and held in engagement with said ratchet $n^3$ by a spring $n^{28}$. The shaft $n^4$ of the setting or counter mechanism N is provided on the outside of its inclosing case $N^1$ with a pointer or finger $n^{29}$ which indicates on the dial $n^{30}$ the position of the wheels of the car in respect to the track lever M on the scale platform and the position of the statement wheel and cam. The shaft $n^4$ of the setting or counter device N is further provided with a handle or lever $n^{31}$ for turning it by hand when desired to set the mechanism or release the printing hammer by hand. In order to hold the operating pawl $n^1$ on the sliding bar $n$ out of engagement with the ratchet $n^3$ when locomotives, tenders, or other cars having different numbers of wheels than the freight cars which it is desired to weigh have, pass over the scale platform, so that such locomotives, tenders, etc., may pass over the scale platform without operating or disturbing the setting or counter device N, I provide said pawl $n^1$ with a removable pin $n^{32}$ which passes through a hole $n^{33}$ in the sliding bar $n$ and enters a funnel-shaped hole $n^{34}$ in said pawl $n$, and thus forces said pawl $n$ out of operative relation with the ratchet $n^3$ until said pin or disengaging device $n^{32}$ is again removed.

The guard track levers P P are each preferably bent levers several feet in length, and are arranged adjacent and parallel to the flexible track rails $A^2$ which bridge the gaps between the ends of the scale platform A and its surrounding frame $A^3$. These guard track levers P P at each end of the scale platform are for the purpose of automatically preventing the descent of the impression hammer as long as any wheel at either end of the car to be weighed is upon either of the flexible track rails $A^2$, so that the reading of the weight cannot possibly take place until after all the wheels of the car are upon the scale platform rails $A^1$. These guard track levers P P, like the flexible or loose track rails $A^2$ are mounted partially or at one end thereof, on the scale platform, and at the other end on the stationary scale frame or the road bed of the railway track. The guard track rails P P thus operate to automatically prevent the descent of the impression hammer as long as any wheel of the car to be weighed depresses either of said levers by means of suitable connecting mechanism between the same and the impression hammer lever $G^1$. This connecting mechanism may be of any suitable kind or construction. It however preferably consists in each track lever P having a connecting link $p$, bent lever $p^1$, link $p^2$, bent lever $p^3$, link $p^4$, bent lever $p^5$, link $p^6$ having spring $p^7$, the link $p^6$ $p^6$ for both track levers P P connecting with a common adjustable link $p^8$, and bent lever $p^9$ and chain or flexible link $p^{10}$ with the bent lever $n^{11}$ by which the impression hammer $G^1$ is raised.

Each of the links $p^6$ has an extension $p^{11}$ furnished with a spring $p^{12}$ for returning the parts to position.

I claim:

1. In a car scale for weighing and recording the weights of cars in motion, the combination with a car scale platform having track rails thereon of loose or yielding connecting rails partially on the scale platform and partially on the surrounding frame, a track lever on the scale platform for operating the impression hammer lever, a pair of guard track rail levers, one at each end of the scale platform adjacent to said loose or flexible connecting rails, a scale beam, a type wheel, a dash pot, a counterbalance spring, a rack connected with the scale beam for operating the type wheel, an impression hammer, an impression hammer lever, a trigger for holding the impression hammer lever in position, a spring for actuating the impression hammer, a paper strip feed wheel, take up wheel and guide rollers, a motor for actuating the take up reel, a printing disk interposed between the paper strip and the impression hammer, a setting and counting mechanism, connections between said setting and counting mechanism and said main track lever, a connecting mechanism between said setting and counting mechanism and said impression lever and trigger, and connecting mechanism between said guard track levers and the impression hammer lever to prevent the impression hammer from striking the type wheel and pointer mark type while any wheel of the car is on either of said guard track levers, substantially as specified.

2. In an automatic weight recording car scale, the combination with a scale platform having track rails thereon, and loose or flexible connecting rails partially thereon and partially on the surrounding frame, a scale beam and type wheel connected with and operated by said scale platform, an impression hammer, a trigger for holding the impression hammer in its lifted position, a spring for actuating said impression hammer when released by said trigger, a track lever on the scale platform for raising and releasing the impression hammer, and a pair of guard track levers adjacent to said flexible connecting rails for preventing the descent of the impression hammer while any of the car wheels are on said flexible connecting rails, substantially as specified.

3. In an automatic weight recording car scale, the combination with a scale platform having track rails thereon, and loose or flexible connecting rails partially thereon and partially on the surrounding frame, a scale beam and type wheel connected with and operated by said scale platform, an impression hammer, a trigger for holding the impression hammer in its lifted position, a spring for actuating said impression hammer when released by said trigger, a track lever on the scale platform for raising and releasing the impression hammer, and a pair of guard track levers adjacent to said flexible connecting rails for preventing the descent of the impression hammer while any of the car wheels are on said flexible connecting rails, and connecting mechanism between said main track lever on the scale platform and said impression hammer and its releasing trigger, substantially as specified.

4. In an automatic weight recording car scale, the combination with a scale platform having track rails thereon, and loose or flexible connecting rails partially thereon and partially on the surrounding frame, a scale beam and type wheel connected with and operated by said scale platform, an impression hammer, a trigger for holding the impression hammer in its lifted position, a spring for actuating said impression hammer when released by said trigger, a track lever on the scale platform for raising and releasing the impression hammer, and a pair of guard track levers adjacent to said flexible connecting rails for preventing the descent of the impression hammer while any of the car wheels are on said flexible connecting rails, and connecting mechanism between said main track lever on the scale platform and said impression hammer and its releasing trigger, said connecting mechanism having a setting or counter mechanism for operation by successive wheels of the car, substantially as specified.

5. In an automatic weight recording car scale, the combination with a scale platform having track rails thereon, and loose or flexible connecting rails partially thereon and partially on the surrounding frame, a scale beam and type wheel connected with and operated by said scale platform, an impression hammer, a trigger for holding the impression hammer in its lifted position, a spring for actuating said impression hammer when released by said trigger, a track lever on the scale platform for raising and releasing the impression hammer, a pair of guard track levers adjacent to said flexible connecting rails for preventing the descent of the impression hammer while any of the car wheels are on said flexible connecting rails, connecting mechanism between said main track lever on the scale platform and said impression hammer and its releasing trigger, and mechanism for connecting each of said guard track levers with a device for preventing the descent of the impression hammer, substantially as specified.

6. In an automatic weight recording car scale, the combination of a scale platform having track rails thereon and connecting track rails partially on the scale platform and partially on the adjacent scale frame or road bed, of a weight printing or recording mechanism having an impression hammer lever, a spring for actuating it and a trigger for holding it lifted, a main track lever on the scale platform for actuating said impression hammer lever, and a guard track lever adjacent to one of said flexible connecting rails to prevent operation of said impression hammer lever while a wheel of a car is on said flexible connecting rail, and mechanism connecting said guard track lever with the impression hammer mechanism substantially as specified.

7. In an automatic weight recording car scale, the combination of a scale platform having track rails thereon and connecting track rails partially on the scale platform and partially on the adjacent scale frame or road bed, of a weight printing or recording mechanism having an impression hammer lever, a spring for actuating it and a trigger for holding it lifted, a main track lever on the scale platform for actuating said impression hammer lever, and two guard track levers adjacent one to each one of said flexible connecting rails and connecting mechanism for said guard track levers to prevent operation of said impression hammer lever while a wheel of the car is on either of said flexible connecting rails, substantially as specified.

8. In an automatic weight recording car scale, the combination with a weight printing or recording mechanism and a car scale platform having track rails thereon, and connecting rails partially thereon, of a main track lever on the scale platform and two guard track levers at the ends of the scale platform and connecting mechanism for said guard track levers to prevent the operation of the weight printing or recording mechanism while any of the wheels of the car are on said connecting rails, substantially as specified.

9. In an automatic weight recording car scale, the combination with a weight printing or recording mechanism and a car scale platform having track rails thereon, and connecting rails partially thereon, of a main track lever on the scale platform and two guard track levers at the ends of the scale platform and connecting mechanism for said guard track levers to prevent the operation of the weight printing or recording mechanism while any of the wheels of the car are on said connecting rails, and connecting means for operating said weight printing or operating mechanism for said main track lever, substantially as specified.

10. In an automatic weight recording car scale, the combination with a weight printing or recording mechanism and a car scale platform having track rails thereon, and connecting rails partially thereon, of a main track lever on the scale platform and two guard track levers and connecting mechanism for said guard track levers one at each end of the scale platform to prevent the operation of the weight printing or recording mechanism while any of the wheels of the car are on said connecting rails, and connecting means for operating said weight printing or operating mechanism for said main track lever, said connecting mechanism having a setting or counter device, substantially as specified.

11. In a car scale, the combination with a scale platform having track rails thereon and connecting rails partially thereon, of a weight printing or recording mechanism, a main track lever for operating the same, and a pair of guard track levers at the ends of the scale platform and connecting mechanism for said guard track levers to prevent operation of the weight printing or recording mechanism while any wheel of the car is on said connecting rails, substantially as specified.

12. In a car scale, the combination with a scale platform having track rails thereon, and connecting rails partially thereon, of a weight printing or recording mechanism, a main track lever for operating the same, and a pair of guard track levers at the ends of the scale platform and connecting mechanism for said guard track levers to prevent operation of the weight printing or recording mechanism while any wheel of the car is on said connecting rails, and a counter thereon in the connection between said main track lever and said printing mechanism, substantially as specified.

13. In a car scale, the combination with a scale platform, of weight recording mechanism, and guard track levers at the ends of the scale platform and connecting mechanism for said guard track levers to prevent operation of said weight recording mechanism while any wheel of the car depresses either of said guard track levers, substantially as specified.

14. In a car scale, the combination with a scale platform, of weight recording mechanism, and guard track levers at the ends of the scale platform and connecting mechanism for said guard track levers to prevent operation of said weight recording mechanism while any wheel of the car depresses either of said guard track levers, and means for operating said weight recording mechanism adapted to be operated by the car wheels on the scale platform, substantially as specified.

15. In a car scale, the combination with a scale platform having track rails thereon and connecting rails partially thereon, of a weight recording mechanism, and guard track levers adjacent to said connecting rails and connecting mechanism for said guard track levers to prevent operation of said recording mechanism while any wheel of the car is on either of said connecting rails, substantially as specified.

GEORGE GOETZ.

Witnesses:
H. M. MUNDAY,
PEARL ABRAMS.